United States Patent [19]

Zell et al.

[11] B 3,914,531

[45] Oct. 21, 1975

[54] POWER ISOLATED TRANSMISSION CABLE ASSEMBLY

[75] Inventors: Dale Richard Zell, Elizabethtown; John Leroy Martin, Hummelstown, both of Pa.

[73] Assignee: AMP Incorporated, Harrisburg, Pa.

[22] Filed: Mar. 29, 1974

[21] Appl. No.: 456,346

[44] Published under the Trial Voluntary Protest Program on January 28, 1975 as document no. B 456,346.

[52] U.S. Cl. .............. 174/36; 174/117 F; 333/84 M

[51] Int. Cl.[2] .............................................. H01B 7/08

[58] Field of Search ............... 174/36, 117 R, 117 F, 117 FF, 174/115, 88 R, 78; 333/84 M, 81 A, 333/73 S, 32, 84 R

[56] References Cited

UNITED STATES PATENTS

| | | | |
|---|---|---|---|
| 3,179,904 | 4/1965 | Paulsen | 174/117 F X |
| 3,459,879 | 8/1969 | Gerpheide | 174/117 F X |
| 3,576,941 | 5/1971 | Colglazier | 174/117 FF |
| 3,612,744 | 10/1971 | Thomas | 174/117 FF X |
| 3,703,604 | 11/1972 | Henschen et al. | 174/117 FF X |
| 3,704,164 | 11/1972 | Travis | 174/117 FF X |
| 3,728,661 | 4/1973 | Kassabgi | 174/117 F X |
| 3,757,029 | 9/1973 | Marshall | 174/117 F X |
| 3,763,306 | 10/1973 | Marshall | 174/117 F X |
| 3,764,727 | 10/1973 | Balde | 174/117 FF X |
| 3,818,117 | 6/1974 | Reyner et al. | 174/36 |

FOREIGN PATENTS OR APPLICATIONS

| | | | |
|---|---|---|---|
| 1,028,980 | 5/1966 | United Kingdom | 174/117 FF |

OTHER PUBLICATIONS

Angele, W., Flat Conductor Cable Manufacture and Installation Techniques, 15th Annual Wire & Cable Symposium 12–9–66.

Schuh, A. G., Flat Flexible Cable and Wiring–Types, Materials, Constructions and Features, Insulation/Circuits, Vol. 16, No. 11, pp. 27–34, Oct. 1970.

Flat Cable, The Modern Cable System for Electronic Applications, Tape Cable, Burnoy Corp. 10–28–69.

*Primary Examiner*—Arthur T. Grimley
*Attorney, Agent, or Firm*—Russell J. Egan, Esq.

[57] ABSTRACT

An improved matched impedance and power transmission cable assembly is disclosed having a pair of flat flexible cables. Each cable comprises a flexible insulating substrate with circuitry on both sides thereof, each covered by an insulation layer. The cables are arranged in stacked fashion with shielding circuitry on the exterior surfaces. The pair of cables is enclosed in a protective sheath and terminated with appropriate terminal means. The circuitry on both sides of each of the two flat flexible cables has a periodic repetition rate so that the cables can be terminated at suitable intervals thus obviating the need to form such cables in a multiplicity of different lengths.

9 Claims, 8 Drawing Figures

POWER ISOLATED TRANSMISSION CABLE ASSEMBLY

BACKGROUND OF THE INVENTION

1. Field of the Invention

The present invention relates to matched impedance and power transmission cable assemblies and in particular to cables formed by at least a pair of flat flexible cables having circuitry on both sides thereof.

2. Prior Art

Various flat multiple conductor cable configurations are known. These can be broadly classified into a first group comprising a plurality of round wires positioned in parallel relationship to each other and embedded in suitable dielectric and a second group comprised of flat ribbon-like conductors also positioned in parallel relationship to each other and embedded in dielectric material. Descriptions of these known cable configurations can be found in U.S. Pat. Nos. 3,179,904; 3,462,542; and 3,576,723.

An important consideration in flat cable design is the control of the cable impedance. Prior attempts at providing suitable impedance control of known cable configuration have proved unsuccessful. In one cable design, illustrated in FIG. 3 of the aforementioned U.S. Pat. No. 3,179,904, round wires are laid side by side in an alternating ground and signal conductor configuration. With such a design, cable impedance control is limited to varying the spacing between the conductors and/or varying the dielectric material. When this cable is to possess a 125 ohm impedance, required for many applications, the wires must be made large relative to their spacings. For example, it is common to find such cable, when designed with impedances in the usable range of a 125 ohms or less to possess 0.0125 inch diameter wire on 0.025-inch centers. With such a configuration termination problems exist because of the relatively small spacings between adjacent conductors. To vary the dielectric material to provide a cable having the 125 ohms or less impedance greatly increases the cost of the cable.

A second configuration, again using round wires for the signal conductors, is illustrated in FIG. 1 of U.S. Pat. No. 3,179,904. In this configuration a series of parallel, adjacent round signal conductors are located in a first plane while a ground plane is positioned in second plane in confronting relation to the signal conductors. From an impedance control point of view this cable design is an improvement over the alternate ground and ground signal conductor configuration previously discussed, although control of the impedance to place it in the desired 125 ohms range requires strict control of the spacing between the signal conductors and the ground plane and the dielectric constance of the dielectric. Further, with respect to the termination of such a cable, the ground plane must be peeled back presenting certain obvious manufacturing difficulties.

Still another cable configuration, illustrated for example in FIG. 5 of the aforementioned patent, comprises a plurality of flat ribbon-like conductors arranged in parallel in the alternating ground and signal conductor configuration. Such cables generally possess impedances in the range of 110 to 120 ohms. However, due to the limitations on cable dimensions as a result of constraints put on by the equipment with which the cable is to be used there is no possibility of substantially varying this impedance. Further, even though the impedance may be in the usable range for some applications, shielding effectiveness of the cable is very poor and thus cross talk between cables becomes extremely troublesome. Although the cross talk may be reduced somewhat by off-setting stacked cables, as shown in FIG. 5 of U.S. Pat. No. 3,179,904, sufficient cross talk still remains to cause problems.

The configuration of FIG. 3 of U.S. Pat. No. 3,459,879, wherein a plurality of flat ribbon-like signal conductors are positioned in a first plane with a ground plane positioned in a second plane in confronting relationship to the signal conductors, presents the problem that the impedance of the cable is reduced to a value so low that it is too low for use with many types of equipment. When these cables are stacked, as is often the case, the signal conductors are sandwiched between two ground planes and thus the impedance can obtain a value of 20 ohms or less which results in excessively high loads on driver circuits. An attempted solution to this low impedance problem has been to decrease the width of the signal conductors. Although this does have the tendency to increase the cable impedance, the increase is often insufficient to meet equipment criteria. Since the width of the signal conductors have been reduced there is also a substantial decrease in the current carrying capacity of the conductors. Further, since the signal conductors are made very fine and/or the dielectric is made relatively thick, bending of the cable often results in fracture of the signal conductors because of the greatly increased circumferentail path which the signal conductor takes. Further, a thick dielectric results in very stiff cables preventing its use in the certain physical environments.

In flat cables, such as those described generally above, termination of the cable often presents a problem. In U.S. Pat. No. 3,697,925 there is described a terminating connector which is inserted through the insulation of a flat cable to contact each signal conductor. A transfer zone on the shield member is devoid of electrically conductive material so that the connector contact may be inserted through the zone and contact the signal conductors without coming into contact with the shield member. A problem with such a termination technique is that the absence of shielding material in the area of the termination often significantly alters the cable impedance at the termination area which results in an intolerable cable/connector impedance mismatch.

U.S. Pat. No. 3,703,604 teaches a shielded flat cable having a plurality of signal conductors in a parallel, spaced arrangement in a first place and a conductive shield member in a second plane in confronting relationship with the signal conductors. The shield member or ground plane and the signal conductors are separated by a suitable dielectric. To control the cable impedance, portions of the ground plane facing the signal conductors are removed. Preferably, the deleted sections of the ground plane from thin slots running substantially the length of the signal conductors. This controlled removal of ground plane material decreases the signal conductor to ground plane capacitance to thereby alter the cable impedance. By selectively varying the ratio of the width of the signal conductors to the width of the slots in the ground plane, the cable can be effectively "tuned" over a wide range of impedances.

In a stacked cable configuration, the signal conductors of one cable are placed in confronting relationship to the ground plane of the other cable rather than in confronting relationship to its slots. To further increase isolation between cables, they may be spaced a small distance from each with insulation material such as plastic foam filling the space.

The terminating ends of the cable may be formed with a ground plane free zone to accept a terminating connector such as that described in the aforementioned U.S. Pat. No. 3,697,925. To aid in impedance matching the cable to the connector thin conductive bridging strips may be formed in this zone integral with the ground plane. The conductive strips tend to increase the cable capacitance in the terminating area to compensate for an inductive mismatch.

While each of the above discussed patents have described improvements in impedance matching, they have not taught cables which can be formed of great length and cut to lengths approximating the required length or for power transmission cables having isolated power circuits. At first glance it may seem that neither cable length or isolated power circuits would be much of a problem. For example, two or more signal conductors in U.S. Pat. No. 3,703,604 could apparently be bused together to form a power conductor. However, this raises new and additional problems since the shielding discussed in this patent would be inadequate for power transmission and the power lines would not be suitably isolated. Also this patent teaches forming zones devoid of conductive material and adjacent windows at each end of the cable. Clearly this concept does not lend itself to producing cables of great length which can be cut to the approximate needed length and suitably terminated.

SUMMARY OF THE INVENTION

The present invention concerns a matched impedance and isolated power circuit transmission cable assembly including at least two flat flexible cables enclosed in an outer protective sheath and terminated at each end by common terminal means. Each of the flat flexible cables includes a flexible insulating substrate with circuitry on both sides thereof and insulation covering the circuitry. The circuitry on one side of each cable includes at least one shield member in the form of a conductive ground plane while the circuitry on the opposite side includes a plurality of spaced apart, parallel signal conductors and/or a plurality of spaced apart parallel power conductors, at least some of which can be bused together to achieve various power ratings, and single lines isolating the power circuits.

It is therefore an object of the present invention to produce a matched impedance and a shielded or isolated power circuit in a single cable assembly.

It is another object of the present invention to produce a matched impedance and power cable assembly which includes at least two different amperage level power conductors in a single cable assembly.

It is still another object of the present invention to produce a matched impedance and power cable assembly in which the circuits on the flat flexible cables incorporated therein are repeated at regular intervals so that the cable assembly can be produced in infinite lengths and cut to finite lengths approximating the desired or necessary length of the cable assembly.

It is yet another object of the present invention to produce an improved flat flexible cable having matched impedance circuits and at least two completely isolated power lines of different ratings on a single cable.

It is a further object of the present invention to produce an improved flat flexible cable having, on a single insulator substrate, a plurality of signal lines and a ground line forming impedance matched circuits and at least two power lines, preferably of different ratings, isolated by single lines.

It is a still further object of the present invention to produce a cable assembly which can be readily and economically manufactured.

The means for accomplishing the foregoing and other objects and advantages of the present invention will be made apparent from the following detailed description related to a preferred embodiment and described with reference to the accompanying drawings.

DETAILED DESCRIPTION OF THE PREFERRED EMBODIMENT

Figure 1:
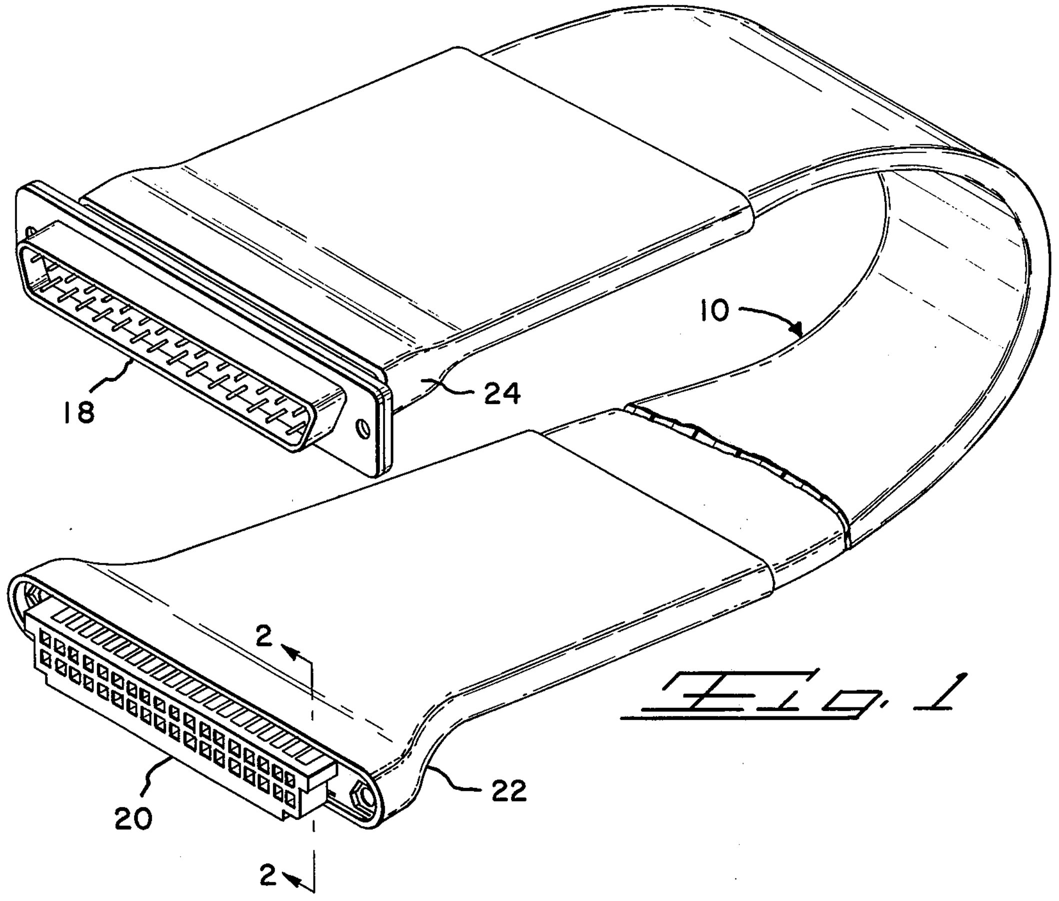
FIG. 1 is a perspective view of the subject cable assembly.
Figure 2:
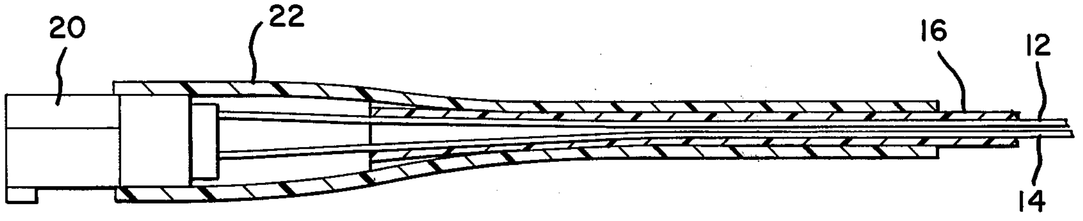
FIG. 2 is a longitudinal section through one end terminal of the subject cable assembly.

The individual flat flexible cables, which are shown in FIGS. 3 to 8 and used to make up the subject cable assembly, can be manufactured according to any of the well known methods such as the method described in U.S. Pat. No. 3,413,218, known as a mechanical subtractive process, or through the use of photo etching apparatus, such as the one described in U.S. Pat. No. 3,712,735, and a chemical subtractive process or a chemical additive process. It should also be noted that these cables can be terminated by any of the well known crimp connecting devices, such as described in U.S. Pat. No. 3,395,381, applied by apparatus, such as described in U.S. Pat. No. 3,553,836.

The subject cable assembly 10 includes first and second flat flexible cables 12, 14 surrounded by flexible protective sheath 16 and terminated by end terminals 18, 20. A strain relief member 22, 24, such as a boot of heat shrinkable plastics material, can be included encompassing the end terminal and engaging the sheath. The sheath is preferably formed of a woven nylon or other material which is resistant to abrasion.

Figure 3:
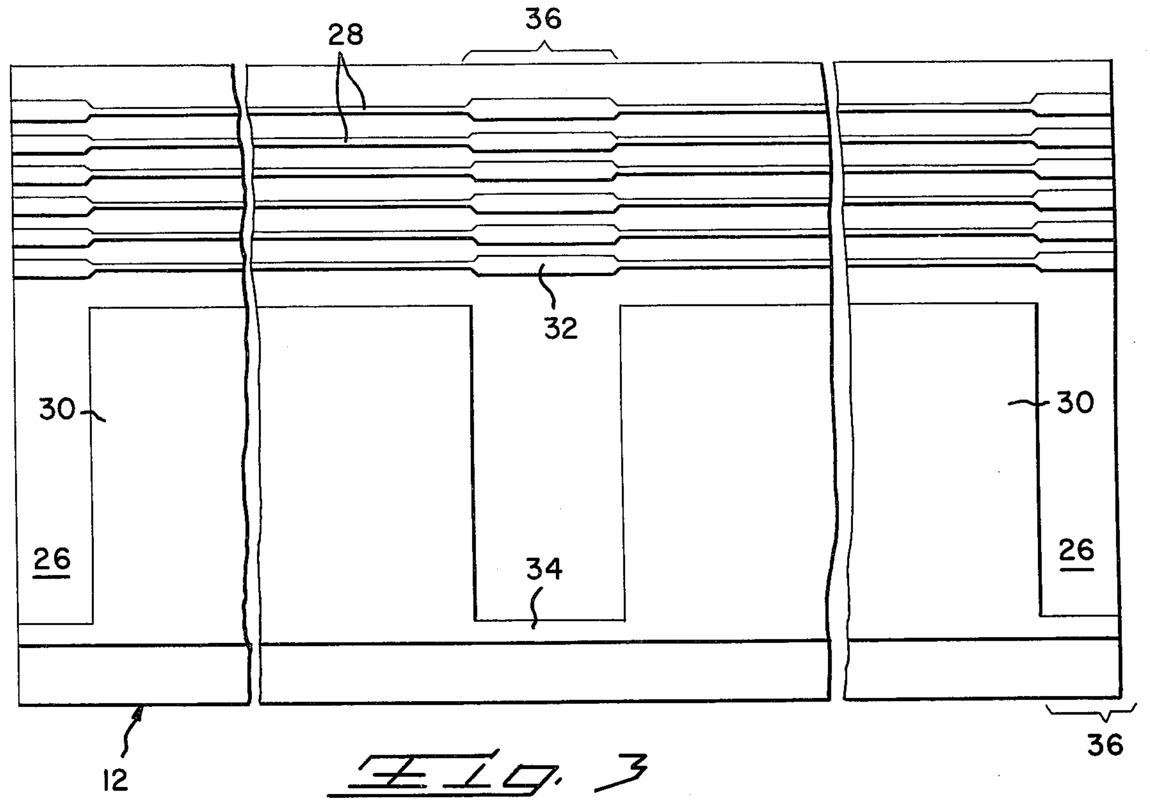
FIG. 3 is a plan view of the obverse side of one flat flexible cable incorporated into the subject cable assembly.
Figure 4:
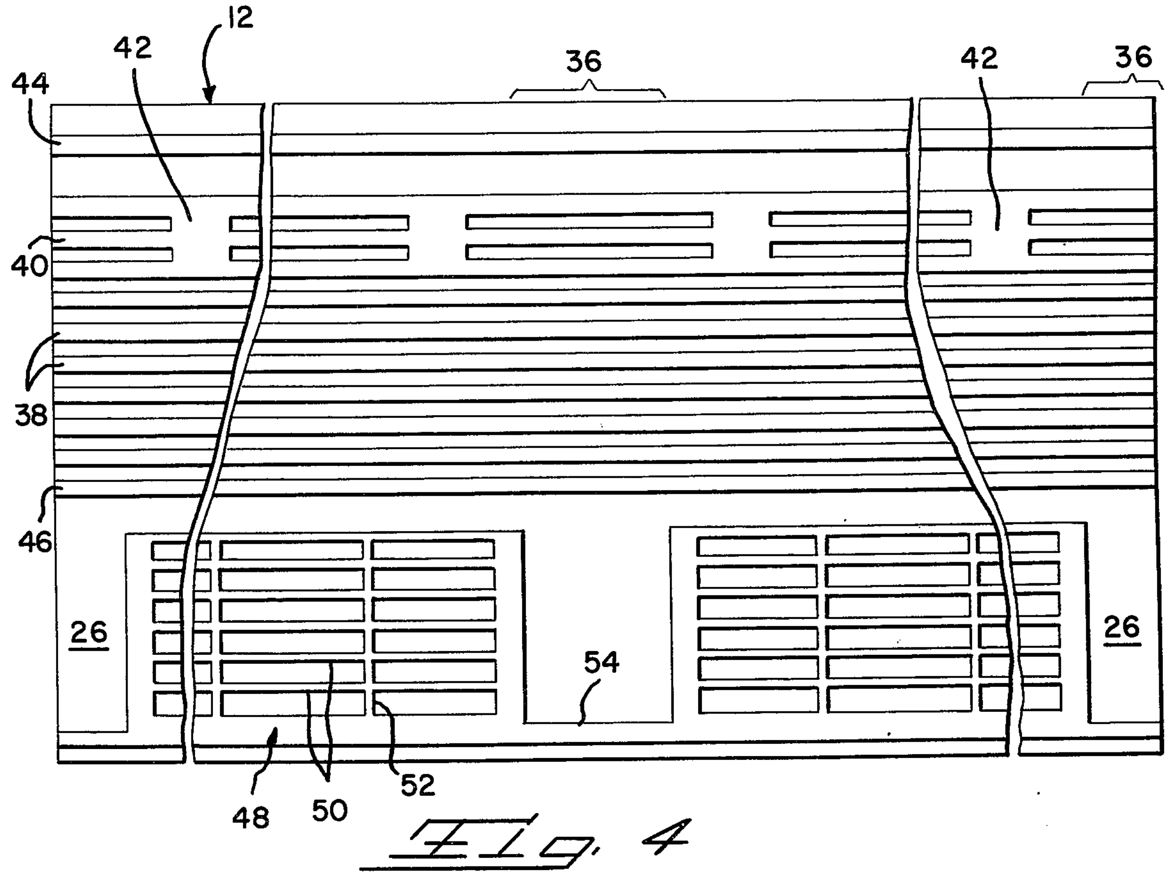
FIG. 4 is a plan view of the reverse side of the flat flexible cable shown in FIG. 3.
Figure 5:
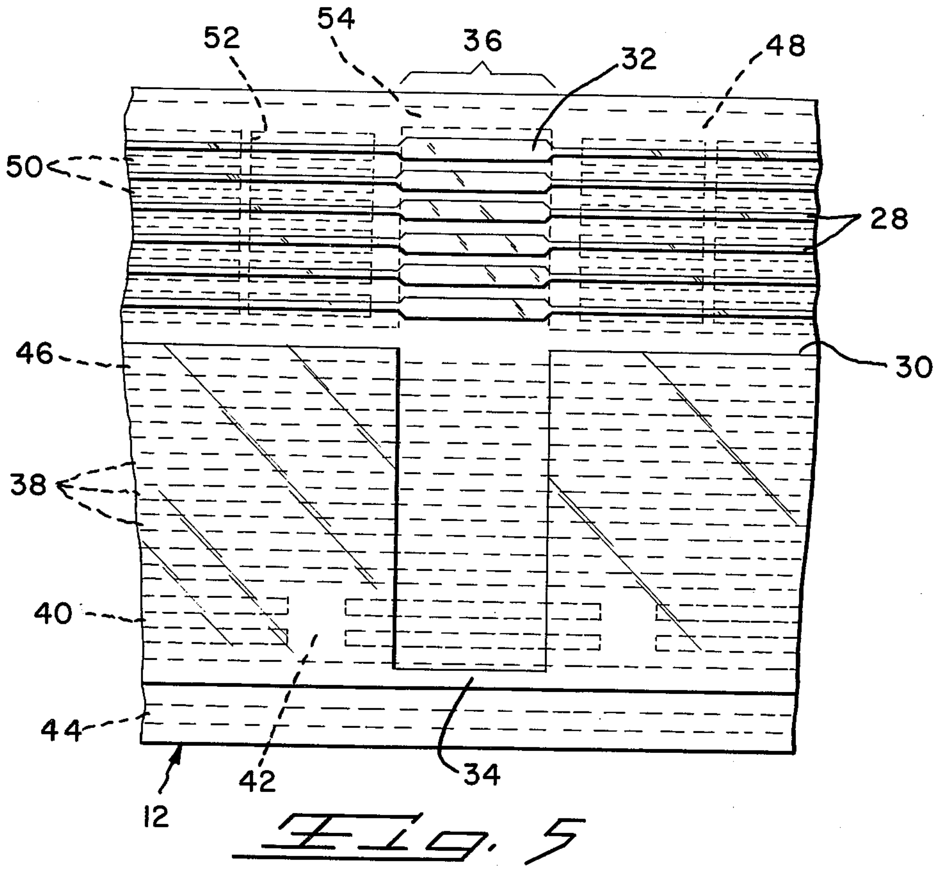
FIG. 5 is a fragmentary view of the flat flexible cable shown in FIGS. 3 and 4 illustrating the registration of the circuitry on both sides of the cable.
Figure 8:
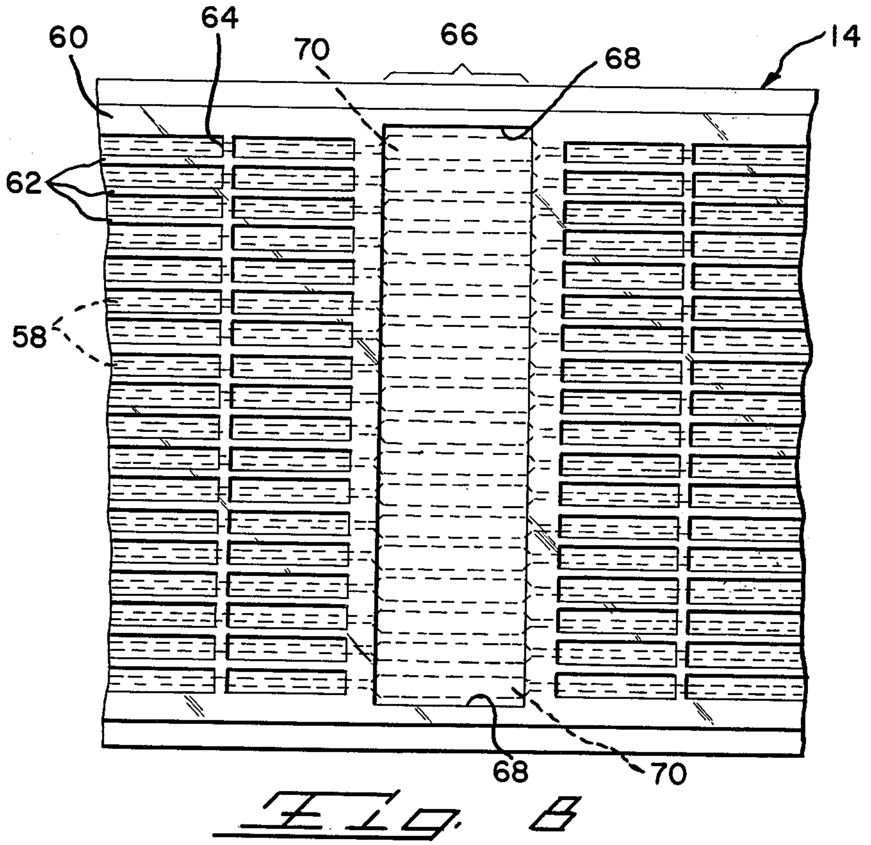
FIG. 8 is a fragmentary view of the flat flexible cable shown in FIGS. 6 and 7 and illustrating the registration of the circuitry on both sides of the cable.
Figure 6:
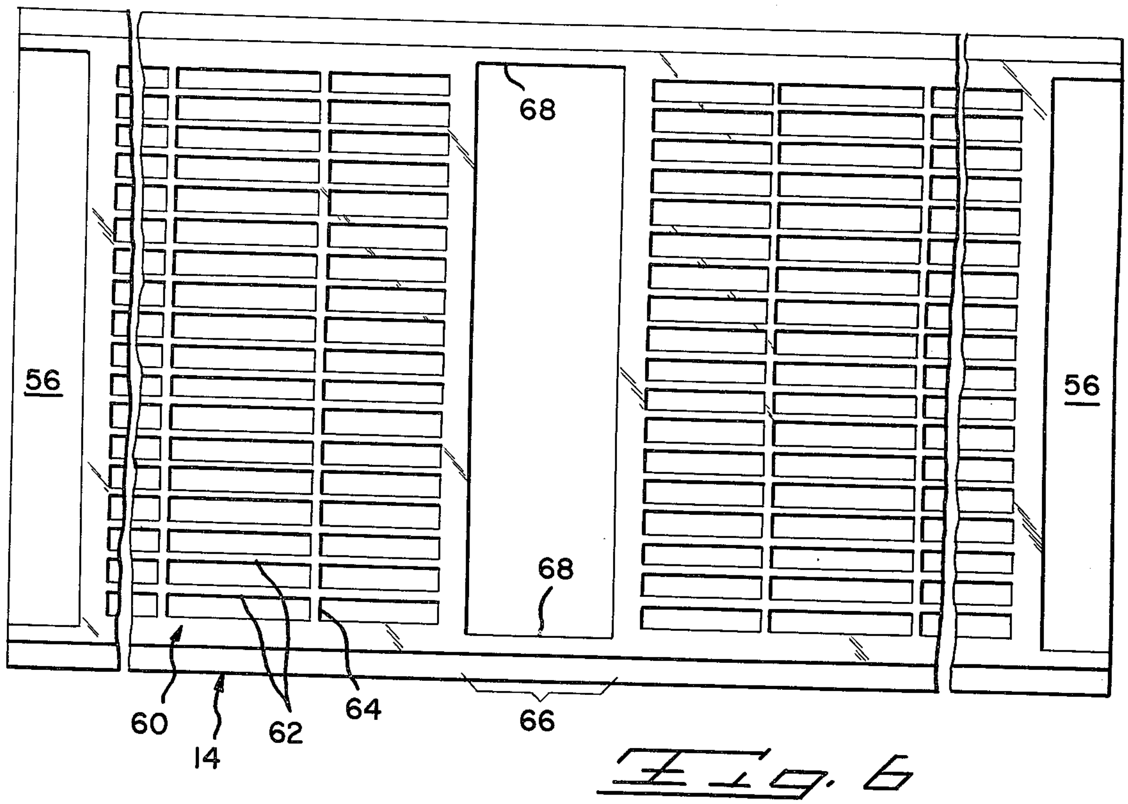
FIG. 6 is a plan view of the obverse side of the second flat flexible cable incorporated into the subject cable assembly.
Figure 7:
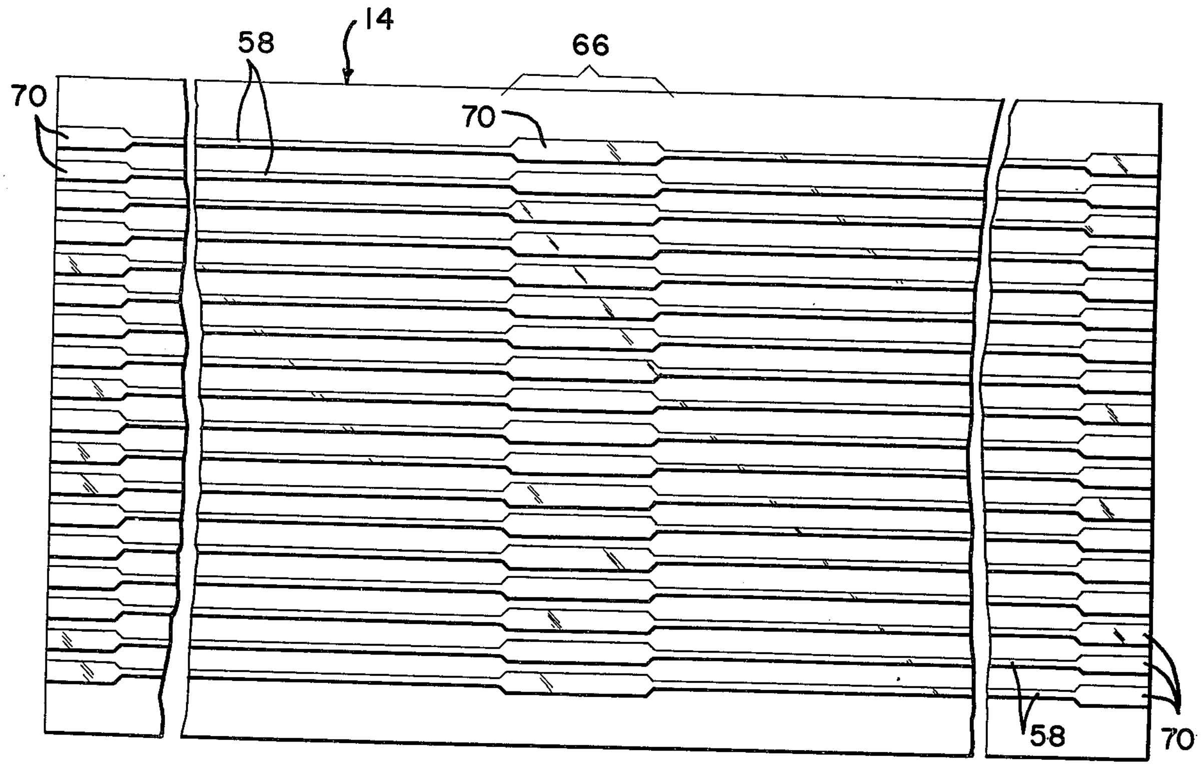
FIG. 7 is a plan view of the reverse side of the flat flexible cable shown in FIG. 6.

The first flat flexible cable 12 is shown in detail in FIGS. 3, 4 and 5. This cable comprises a flexible insulating substrate 26 having circuitry formed on both sides thereof by one of the previously mentioned known methods. On the obverse of the substrate there is a plurality of parallel, spaced apart signal conductors 38 and a conductive ground plane shield member 30. The signal conductors are provided with termination pads 32 at regularly spaced intervals along the cable while the shield member 30 has a narrow interconnect 34 aligned with pads 32 to define periodic spaced termination windows 36. On the reverse of the substrate there are a plurality of parallel spaced apart first power conductors 38, a plurality of parallel, spaced-apart second power conductors 40 periodically interconnected by buses 42, single ground conductors 44 and 46 to either side of the power conductors, and ground plane 48. The ground plane 48 includes a plurality of parallel spaced conductors 50 interconnected by buses 52 with adjacent ground planes interconnected by conductors 54 in the terminal windows 36. The circuitry on both sides of the substrate is covered by a layer of insulation (not shown) by any of the well known methods.

The registration of the circuitry on the obverse and reverse sides of the substrate can best be seen from FIG. 5. The circuitry on both sides of the cable have matching predetermined repetition lengths with termination windows 36 between adjacent patterns. The provision of periodic termination windows allows the cable to be made in long lengths and cut at the termination windows which approximate required length of the cable assembly.

The ground plane shield 30 on the obverse of the cable is aligned opposite the power conductors 38 and 40 with a narrow interconnect 34 in the termination window 36. This shield 30 isolates the power lines 38 and 40 from the impedance matched lines in the second cable 14. It also serves as a shield against random frequency interference from external sources. The power lines 38 and 40 are isolated to either side in the same plane by lines 44 and 46. The ground plane 48 is aligned opposite the signal conductors 28 with interconnect 54 lying in the termination window adjacent pads 32.

The second cable 14 is somewhat similar to the cable described in U.S. Pat. No. 3,703,604 discussed above. The primary difference between the cables is present cable is provided with a plurality of termination windows at regularly spaced intervals, in the manner of the first cable 12, and there is a single ground shield member. This cable includes a flexible insulating substrate 56. A plurality of signal carrying conductors 58 in parallel spaced apart relation are formed on the obverse of the substrate and a single conductive ground plane or shield 60 is formed on the reverse of the substrate. The ground plane 60 includes a plurality of parallel spaced conductors 62 interconnected by bus lines 64 with each repetition of the shield interconnected in a termination window 66 by conductors 68. Each of the signal lines 58 is provided with termination pads 70 at regularly spaced intervals which define termination windows 66. The alignment of the circuitry in the termination windows can best be seen in FIG. 8.

The cables 12 and 14 are stacked to form the cable assembly with the ground plane shields 48 and 60 toward the outside of the assembly. The termination windows 36 and 66 of the cables 12 and 14, respectively, are aligned so that the cables can be cut and terminated at the nearest termination window approximating the desired cable assembly length. It has been found that the preferable spacing of the termination windows be approximately every 6 inches. This allows for an optimum pattern length and approximation of cable assembly length.

The present cable assembly may be subject to many modifications and changes without departing from the spirit or essential characteristics thereof. The present embodiment is therefor intended in all respects to be illustrative and not restrictive.

What is claimed is:

1. A matched impedance and isolated power circuit cable assembly comprising:

at least two flat flexible cables arranged in stacked configuration, each of said cables comprising a flat flexible insulating substrate, circuitry on both sides of said substrate, and insulation covering said circuitry;

one of said cables having a plurality of flat, parallel, spaced apart signal conductors lying in a single plane on a first side of said substrate and a plurality of interconnected flat shield conductors lying in a single plane on the other side of said substrate, said shield conductors extending parallel to said signal conductors and being laterally offset therefrom, said shield conductors having a width which is no greater than the spacing between said signal conductors whereby the edge portions of said shield conductors do not overlap edge portions of said signal conductors;

the other of said cables having on a first side of said substrate a plurality of flat, parallel, spaced apart signal conductors and a single flat, wide ground conductor both lying in a single plane, and on the other side of said substrate at least one power conductor of a first rating, at least one power conductor of a second rating, said power conductors aligned opposite and parallel to said single ground conductor, single flat isolating conductors lying in the same plane as and to each side of said power conductors, and a plurality of interconnected flat shield conductors lying in a single plane extending parallel to and laterally offset from said signal conductors;

sheating means enclosing said flexible cables;

terminal means attached to opposite ends of said cable assembly;

said cables being stacked with said first sides adjacent one another.

2. A cable assembly according to claim 1 wherein each said flat flexible cable further comprises:

a plurality of termination windows spaced therealong at regular intervals, each said conductor having a termination portion lying in each said termination window whereby said cable can be produced in great lengths, cut and terminated at lengths nearest the desired cable length.

3. A cable assembly according to claim 2 wherein each said shield conductor has a termination pad lying in each said termination window offset from the other of said conductors whereby said cable can be uniformly terminated.

4. A cable assembly according to claim 1 wherein said power conductors comprises:

a plurality of parallel, spaced apart first conductors at least some of which are bused together to achieve different power ratings.

5. A cable assembly according to claim 1 wherein said single flat wide ground conductor has a width at least equal to the total width of all of said parallel, spaced apart power conductors.

6. A flat flexible cable having matched impedance and isolated power circuits comprising:

a flat flexible insulator substrate, a plurality of flat, parallel, spaced apart signal conductors lying in a single plane on a first side of said substrate, a plurality of interconnected flat shield conductors lying in a single plane on the other side of said substrate, said shield conductors extending parallel to said signal conductors and being laterally offset therefrom, said shield conductors having a width which is no greater than the spacing between said signal conductors, at least one power conductor of a first rating and at least one power conductor of a second rating on said other side of said substrate, an isolating conductor on either side of said power conductors and in the same plane as said power conductors, and a single ground conductor on said first side of said substrate, said ground conductor having a width at least as wide as the total width of said power conductors and being aligned in opposition to said power conductors.

7. A flat flexible cable according to claim 6 wherein said cable further comprises:

a plurality of termination windows spaced therealong at regular intervals, each said conductor having a termination portion lying in each said termination window whereby said cable can be produced in great lengths, cut and terminated at lengths nearest the desired cable length.

8. A flat flexible cable according to claim 7 wherein each said shield conductor has a termination pad lying in each said termination window offset from the other of said conductors whereby said cables can be uniformly terminated.

9. A flat flexible cable according to claim 6 wherein said power conductors comprise:

a plurality of parallel, spaced apart flat conductors at least some of which are bused together to achieve different power ratings.

* * * * *

UNITED STATES PATENT OFFICE

CERTIFICATE OF CORRECTION

PATENT NO. : 3,914,531

DATED October 21, 1975

INVENTOR(S) : DALE RICHARD ZELL ET AL

It is certified that error appears in the above-identified patent and that said Letters Patent are hereby corrected as shown below:

Column 6, claim 1, line 43, "sheating" should read --- sheathing --- .

Column 6, claim 4, line 63, "comprises:" should read --- comprise: --- .

Column 6, claim 4, line 64, "first" should read --- flat --- .

Signed and Sealed this

*tenth* Day of *February 1976*

[SEAL]

*Attest:*

RUTH C. MASON
*Attesting Officer*

C. MARSHALL DANN
*Commissioner of Patents and Trademarks*